United States Patent [19]
Joh et al.

[11] 3,901,856
[45] *Aug. 26, 1975

[54] METHOD OF PREPARING ACRYLONITRILE POLYMERS

[75] Inventors: Yasushi Joh, Ann Arbor, Mich.; Teruhiko Sugimori, Otake, Japan

[73] Assignee: Mitsubishi Rayon Co., Ltd., Tokyo, Japan

[ * ] Notice: The portion of the term of this patent subsequent to May 29, 1990, has been disclaimed.

[22] Filed: Nov. 27, 1972

[21] Appl. No.: 309,901

Related U.S. Application Data

[63] Continuation-in-part of Ser. No. 120,686, March 3, 1971, abandoned.

[30] Foreign Application Priority Data
Mar. 16, 1970 Japan.............................. 45-21549
May 6, 1970 Japan.............................. 45-38481

[52] U.S. Cl. ... 260/79.3 MU; 260/85.5; 260/88.7 D; 260/89.5; 264/178
[51] Int. Cl. ....... C08f 3/76; C08f 7/04; C08f 15/02
[58] Field of Search.. 260/79.3 MU, 85.5 N, 85.5 P, 260/85.5 D, 88.7 F, 88.7 G

[56] References Cited
UNITED STATES PATENTS
3,736,302   5/1973   Joh............................ 260/79.3 MU

*Primary Examiner*—Christopher A. Henderson
*Attorney, Agent, or Firm*—Armstrong, Nikaido & Wegner

[57] ABSTRACT

In an improved method for polymerization of acrylonitrile or copolymerization of acrylonitrile with other copolymerizable vinyl compounds in the presence of a redox catalyst combination of nitrous acid or salts thereof and reducing sulfoxy compounds, a main feature of which is such that at least parts of the catalyst pair are continuously reacted with each other in advance under such conditions that pH of the catalyst reaction system is within a range of 1.0 to 7.0 and a residence time is substantially constant and then, the resultant catalyst system is continuously fed into a polymerization vessel during the polymerization or copolymerization. Polymers, thus obtained, have advantageous properties suitable for most textile applications.

5 Claims, No Drawings

METHOD OF PREPARING ACRYLONITRILE POLYMERS

CROSS REFERENCE TO RELATED APPLICATIONS

This is a Continuation-in-Part of co-pending U.S. application Ser. No. 120,686, filed Mar. 3, 1971, by the inventors herein and now abandoned.

This invention relates to an improved process for the polymerization of acrylonitrile and more particularly the production of acrylonitrile polymers and copolymers most suitable for textile applications by using a specific redox catalyst system.

So-called redox catalyst systems are extensively employed as well as organic initiators such as azobisisobutyronitrile and the like for the production of acrylonitrile polymers, which are used as raw material for acrylic fibers. On the other hand, redox catalysts comprising nitrous acid or salts thereof and reducing sulfoxy compounds are also known as useful catalysts for the polymerization of various vinyl compounds. However, when the combination of nitrous acid or its salts and reducing sulfoxy compounds is applied, to the polymerization of acrylonitrile, a satisfactory quality of acrylonitrile polymers is not obtainable.

Needless to say, acrylonitrile polymers which are used as raw material for acrylic fibers are required to have many advantageous, properties and their quality has great influence on that of fibers produced therefrom, as it is also true for other synthetic fibers such as nylon, polyester fiber and the like.

The advantageous properties desired for the polymers, for example, are as follows: the polymers should exhibit a. excellent operationability in various steps in the production of fibers; for example, both rapid feeding of polymers, which depends upon their configuration, and stable and constant feeding thereof at the time of preparing a spinning solution, which depends upon bulk density, shape and size of the polymer particles, should be attainable. That is, fluctuations of the polymer feed rate which are caused by a bridge action exerted in the powder should not be observed in the preparation process of the spinning solution. They should also exhibit high spinning stability, stretchability and other processability, for example, in a turbo-stapler. And acrylic fibers produced therefrom should also have b. excellent yarn quality and spinnability, c. high whiteness, d. good heat stability, and e. good dyeability and no fluctuation in dyeing properties. And textile goods manufactured therefrom should also exhibit, f. good hand.

The above-listed properties depend on polymer quality. In order to obtain the polymer which satisfies the above requirements, the catalyst to be employed, polymerization condition and quality control are of great importance. When any of them is inadequate, satisfactory quality of the polymers is not obtainable and hence, the excellent properties desired for acrylic fibers can not be expected even if manufacturing conditions of the fibers are carefully selected on and after spinning.

Now, from the results of extensive research on the preparation of acrylonitrile polymers, which have the above-listed advantageous properties and are suitable for textile applications, it has been found, that when an aqueous solution of nitrous acid or salts thereof and reducing sulfoxy compounds are fed into a polymerization vessel after the two catalyst components are reacted with each other, the catalyst activity extremely increases, on which, the present invention has been accomplished.

Therefore, an object of the present invention is to provide polyacrylonitrile or acrylonitrile copolymer having advantageous properties as raw material for acrylic fibers.

Another object of the present invention is to provide acrylic fibers with advantageous properties, particularly stable and constant property such as level dyeing property.

A further object of the present invention is to provide a method of preparing acrylonitrile polymers and copolymers, which has a decided advantage in the quality control during polymerization.

Other objects and advantages of the present invention will be apparent from the following description.

In accordance with the present invention, there is provided a method for polymerizing acrylonitrile of copolymerizing acrylonitrile with other copolymerizable vinyl compound using nitrous acid or salts thereof and reducing sulfoxy compounds as catalyst components, characterized by continuous reaction of some or all of said catalyst components with each other under such conditions that the pH of the reaction system is within the range of 1.0 to 7.0 and a residence time is substantially constant and then, continuously feeding the resultant catalyst system into a polymerization vessel during the polymerization or copolymerization.

The invention will be illustrated with the following detailed description but is not intended to limit the scope of the invention.

The catalyst components of the invention, i.e., nitrous acid or its salts and reducing sulfoxy compounds are partially or wholly reacted with each other in advance in a reactor before they are fed into a polymerization vessel.

The reaction of the catalyst components should be carried out under such conditions that the pH of the reaction system in the reactor is within the range of between 1.0 and 7.0, preferably between 2.0 to 3.0 or 5.0 to 6.0 and a residence time is substantially constant. The residence time should be constant within the range of 5 to 60 minutes, depending upon the reaction temperatures which are normally 20° to 60°C.

In order to control the polymerization, it is quite important that the reaction of the catalyst components is carried out continuously under the conditions that a residence time is kept substantially constant. If the catalyst components are reacted neither constantly nor continuously, the resultant catalyst system to be fed into a polymerization vessel exhibit extremely fluctuating catalyst activities, because the catalyst active components produced therethrough are fairly chemically changed with time both in the catalyst reactor and in a feeding tank. Therefore, from the technical standpoint, it becomes extremely difficult to control the polymerization, particularly the degree of polymerization, resulting in deterioration of the quality of the polymer. It is, however, surprising that such problems have been successfully solved by the continuous reaction of this invention.

Reducing sulfoxy compounds, which are used as one component of the redox catalyst combination in this invention, include, for example, sulfurous acid, sulfites such as sodium sulfite, potassium sulfite and ammonium sulfite, bisulfites such as sodium bisulfite, potassium bisulfite and ammonium bisulfite, and metabisulfites such as sodium metabisulfite and potassium metabisulfite.

Thus, in accordance with the method of this invention wherein the particular catalyst components are reacted with each other in advance before they are fed into a polymerization vessel, the beneficial effects are obtained as listed below.

1. The conversion increases with a remarkable increase of the catalyst activity, which results in the great expansion of the productivity and the reduction of the amount of the catalyst to be used. Thus, the method of this invention is advantageous from an economical viewpoint.

2. The viscosity of slurry (containing polymer, monomer and medium) during polymerization is low, which improves the stirring efficiency. Consequently, entirely homogeneous polymers are obtainable.

3. Further, the low viscosity of slurry makes it possible to raise the concentration of monomer to be fed into a polymerization vessel, which also results in the great expansion of the productivity.

4. Abnormal polymer adherents are scarcely produced on the inner wall of a polymerization vessel and on an agitator during polymerization, which enables a continuous operation for long periods, and resulting polymers are not contaminated with abnormal polymers which are hardly dissolved in usual solvents.

5. The polymers, thus prepared, exhibit high solubility in usual solvents for spinning and the resulting spinning solution has good stability.

6. The polymers are exceedingly superior in heat stability and whiteness.

7. The spinning solutions of the polymers have an improved filterability.

8. Further, the filaments to be manufactured from the polymers are exceedingly superior in spinnability, particularly stretchability to those from polymers prepared in such a manner that the redox catalyst combination is separately fed into a polymerization vessel.

The catalyst system, some or all of which has been continuously reacted with each other under such conditions that the residence time is constant, are continuously fed into a polymerization vessel while the polymerization or copolymerization of acrylonitrile with other copolymerizable vinyl monomers is carried out. Conditions of the polymerization or copolymerization carried out in the polymerization vessel involve the temperatures of 40° to 60°C, preferably 50° to 55°C and the pH of the polymerization system within the range of 1.0 to 3.0, preferably 2.2 to 2.8.

The amount of catalyst utilized in the polymerization as well as the ratio of the individual catalyst components are those conventionally known in the art, for example, as disclosed in Japanese Pat. No. SHO 34-2439. Preferably, the amount of the reducing sulfoxy compound in terms of sodium bisulfite is from 1 to 20%, most preferably from 2 to 10%, based on the weight of the monomer while the amount of nitrous acid or water soluble salts in terms of sodium nitrite is from 1/100 to ½, most preferably from 1/5 to 1/50, of the sodium bisulfite.

Suitable monomers for the copolymerization with acrylonitrile are all vinyl compounds which are usually employed for the copolymerization with acrylonitrile, more particularly, which are used for the production of polymer for spinning of acrylic fibers, such as vinyl acetate, methyl acrylate, methyl methacrylate and methacrylonitrile. Basic or strong acid group-containing monomers which are employed to impart greater dyeability to the fiber spun, such as vinyl pyridines, sodium styrene sulfonate, sodium methallyl sulfonate and the like, are also enumerated as examples. Generally, the acrylonitrile copolymers obtainable according to the invention contain at least 80% by weight of acrylonitrile.

As illustrated above, the acrylonitrile polymers or copolymers which are of considerable interest as raw material for the production of acrylic fibers can be obtained at a low cost and in a simplified method due to the catalytic action peculiar to the method of this invention. And quality control during polymerization can be definitely assured in accordance with the invention. Therefore, the invention will contribute to the development of industries of acrylic fibers.

The invention will be further illustrated with reference to examples, in which all "parts" and "%" indicate parts by weight and % by weight, respectively, unless otherwise specified.

CONTROL EXAMPLE 1

A monomeric mixture of 94 parts acrylonitrile and 6 parts methyl acrylate sodium nitrite, sodium metabisulfite and sodium methallyl sulfonate solutions were separately fed into a 10 l glass vessel designed for continuous polymerization, to cause polymerization.

Sulfuric acid solution was added in the vessel so as to adjust the pH of the polymerization system to 2.5. The polymerization temperature was 55°C. The amount of sodium methallyl sulfonate used was 0.5% and that of sodium nitrite and sodium metabisulfite both used as catalysts were 0.5% and 7%, respectively, based upon the total weight of the monomer. The weight ratio of water to the monomeric mixture was 7/1 at a steady state.

During the polymerization, the viscosity of the polymer-monomer-water slurry was considerably high and hence, some difficulties were encountered in the operation of uniformly stirring the slurry. The conversion was 52% at the average residence time of 160 minutes.

In order to determine the degree of polymerization of the polymer, thus obtained, the viscosity was measured, showing that the reduced viscosity was 1.78 at $C = 0.2$ in DMF.

The resultant polymer mass proved to contain coarse and hard polymer particles. The continuous operation for a week also proved that large quantities of hard polymers adhered to the inner wall of the vessel and to an agitation, and the shape of polymer particles was not uniform at all.

Further, the polymer mass was apt to exert a bridge action on each other at feeding, resulting in frequent fluctuations in the polymer feeding rate in the process of preparing a spinning solution therefrom, which caused some troubles in operation.

Finally, filaments were spun by a normal dry spinning procedure from a dimethylformamide solution containing 29% of the resultant polymer. Spinning conditions were as follows: the temperature of the spinning solution, 120°C; the spinning speed, 300 m/min; hot air streams were applied in parallel to the extruded filaments.

Undrawn filaments, thus obtained, were drawn in a water bath at a temperature of 100°C, which proved that the filaments were greatly inferior in stretchability, that is, in case they were drawn to approximately three times their original length, filament breakage and fluffing were caused to a great extent and consequently, it was impossible to obtain satisfactory filaments.

CONTROL EXAMPLE 2

Acrylonitrile, sodium nitrite solution, acid sodium sulfite solution and sulfuric acid solution were separately fed into a 10 l glass vessel designed for continuous polymerization to cause polymerization. The polymerization temperature was 55°C and pH was 2.3. The weight ratio of water to acrylonitrile was 9/1. The amounts of sodium sulfite and acid sodium sulfite were 0.5% and 5.3%, respectively, based upon the total weight of the monomer.

The conversion was 55% under a steady state at the average residence time was 160 minutes.

The resultant polymer slurry proved not to be homogeneous and contained hard particles.

The reduced viscosity of the polymer, except the hard particles was 2.2 (determined at C = 0.2 in dimethylformamide at a temperature of 25°C). The standard deviation of the viscosity was 0.13 (n = 38), illustrating that the viscosity fluctuation was extremely high. The reduced viscosity of the hard particles removed from the polymer slurry 2.85 (determined in the same manner as the above).

The above abnormal polymer proved to be increased with the polymerization time. That is, the abnormal polymers like hard stones having diameters of 5 to 15 mm were produced on the bottom of the polymerization vessel. Moreover, abnormal polymers were produced both on the inner wall of the polymerization vessel and on an agitator, which made it impossible to carry on continuous operation for a long period.

Polyacrylonitrile, thus obtained, was dissolved in dimethylformamide to prepare a spinning solution containing 24% of the polymer. When the filaments were spun from the spinning solution under the same conditions as those of Control Example 1. The spinnability was poor, that is, filament breakage at spinning occurred frequently. Undrawn filaments, thus obtained, also proved to be inferior in stretchability, that is, in case they were drawn in a boiling water bath, a maximum draw ratio was only five times their original length.

CONTROL EXAMPLE 3

A monomeric mixture of 93.5% acrylonitrile, 6% methyl acrylate and 0.5% sodium methallyl sulfonate, respectively, was continuously polymerized in a 10 l glass vessel designed for continuous polymerization. A polymerization temperature was 55°C. Sulfuric acid solution was fed into the vessel to adjust the pH of the polymerization system to 2.5. The weight ratio of water to the monomeric mixture was 9/1.

As catalysts, sodium nitrate and sodium sulfite, the amounts of which were 0.5% and 7%, respectively, based on the weight of the monomeric mixture, were used. The catalysts were not separately fed into the polymerization vessel but fed after mixing and reacting previously and batchwisely. The preparing method of catalyst system was as follows; the catalyst components were reacted with each other at the temperature of 30°C for 30 minutes in a reactor. Sulfuric acid solution was added in the reactor to adjust the pH to 3.9. The catalyst solution, thus prepared, was reserved in a feeding tank, from which the solution was fed into the polymerization vessel. In the feeding tank, the catalyst solution was maintained at the temperature of 20°C and remained for the period ranging from 0 to 8 hours.

Polymerization conditions were the same as those of Control Example 1 except that the catalyst solution prepared by reacting the two components with each other in the catalyst reactor, was used. However, the entire aspect of polymerization differed from those of the previous Control Examples; the viscosity of the slurry was low and hence, it was easy to uniformly stir. Polymer particles in the slurry were homogeneous. The conversion was 65% at the average residence time of 160 minutes which was extremely high in comparison with that of Control Example 1.

The average reduced viscosity of the resulting polymer was 1.65 at C = 0.2. The production of abnormal polymers and the polymer adhesion to the inner wall of the vessel were hardly observed through the polymerization. They were slight even after long periods of operation, assuring a stable operation.

Further, the polymer mass scarcely exerted a bridge action on each other at feeding, resulting in the decrease fluctuations of feeding rate in preparing a spinning solution therefrom.

When filaments were spun from a dimethylformamide solution containing 29% of the polymer under the same conditions as those of Control Example 1, there were produced undrawn filaments having exceedingly high stretchability, which were capable of being drawn to 8.5 times their original length without breakage. The filaments were also superior in whiteness.

However, the control of the degree of polymerization was extremely difficult during polymerization thereof; the standard deviation ($\sigma$) was 0.12 (n = 33) for an average reduced viscosity of 1.65, which was accompanied with the amount fluctuation of the strong acid group introduced into the polymer molecule, resulting in remarkably uneven dyeing.

EXAMPLE 1

The same process as that of Control Example 1 was repeated, except that the preparation of the catalyst system was carried out in a continuous manner considering the inevitable change of catalyst activity with time.

That is, the two catalyst components were continuously fed by means of a metering pump into a catalyst reactor, of which volume was so determined that the residence time in the reactor corresponded to 30 minutes. The temperature in the reactor was adjusted to 30°C. The pH of the reaction system was also adjusted to 5.5 ± 0.2 by continuously feeding sulfuric acid solution.

The entire aspect of polymerization was nearly the same as that of Control Example 3 except that by far better efficient and strict control of the polymerization could be achieved, which resulted in stabilization of the degree of polymerization.

That is, the average reducing viscosity of polymers thus obtained, at 25°C and C = 0.2, was 1.65 and the standard deviation ($\sigma$) of the viscosity was 0.02 (n = 30).

Knitted fabrics of the fibers spun from the above polymers by the usual procedure did not exhibit uneven dyeing in the least.

EXAMPLE 2

Acrylonitrile was continuously copolymerized with a continuous feeding of catalyst system which had been continuously reacted under the same conditions as those of Example 1 except that the temperature, residence time and pH were adjusted to 55°C, 15 minutes and 4.0 respectively.

The conversion was 67% at the average residence time of 160 minutes. The reducing viscosity at C = 0.2 was 1.62 and the standard deviation ($\sigma$) was 0.012, illustrating that the polymer had a more improved uniformity. Whiteness and heat stability also proved to be more improved.

When the filaments were spun from dimethylacetamide solution containing 23.5% copolymer by a usual wet spinning procedure, extremely high spinnability was observed and a maximum draw ratio was 9.5 times the original length of the filaments. For comparison with the above, in case where the polymer prepared in Control Example 1 was wet-spun under the same conditions as those described above, a worse spinnability was observed and a maximum draw ratio was only 5 times.

EXAMPLE 3

Acrylonitrile was polymerized under the similar conditions to those of Control Example 2 except the catalyst preparation as follows:

The entire amount of sodium nitrate and a half amount of sodium acid sulfite, were continuously fed into a catalyst reactor and reacted with each other under such conditions that the temperature, residence time and pH were 55°C, 20 minutes and 6.0 respectively. The resultant catalyst system and the remaining half of sodium acid sulfite were continuously and separately fed into a polymerization vessel during polymerization.

The conversion was 66%, which is extremely high in comparison with the 55% conversion of Control Example 2 wherein the redox catalyst component was separately fed into a polymerization system.

The polymer, thus obtained, exhibited improved homogeneity. The reducing viscosity was 2.12 and the standard deviation ($\sigma$) was 0.022.

Abnormal polymer particles, like hard stones were not produced, in the least and unusual polymer adhesion to the inner wall of the polymerization vessel and the agitator was hardly observed, which made it possible to carry on stable operation for a long period of time.

When the filaments were spun by a dry spinning procedure under the same conditions as those of Control Example 2, both spinnability and stretchability proved to be extremely high; a maximum draw ratio was 8.5 times.

EXAMPLE 4

Copolymerization was carried out under the same conditions as those of Example 2 except that the weight ratio of water to the monomers was 5/1.

Through the concentration of the monomers was higher, no noticeable troubles were caused and the viscosity of the polymer-monomer-water slurry was adequate during polymerization except that it slightly increased at the beginning of polymerization. The polymerization was stably carried out, which was similar to that in Example 2.

The conversion was 70% and the reducing viscosity was 1.59 at C = 0.2.

Compared with the above, in case where Control Example 1 was repeated, except that the weight ratio of water to the monomers was 5/1, the viscosity of the slurry inevitably increased and consequently, it was impossible to stir and the operation could not be continued.

EXAMPLE 5

Acrylonitrile was copolymerized under the same conditions as those of Example 1 except reaction conditions of the catalyst components in the catalyst reactor such as the temperature of 55°C, the residence time of 15 minutes and the pH of 2.5.

The conversion was 79% at the average residence time of 160 minutes. The reducing viscosity was 1.59 at C = 0.2 and the standard deviation ($\sigma$) was 0.01. The copolymer proved to have more improved homogeneity, whiteness and heat stability.

When the copolymer filaments was prepared from dimethyl-acetamide solution containing 23.5% the polymer by a usual wet spinning procedure, extremely high spinnability and the maximum draw ratio of 9.5 times were observed. Compared with the above, the copolymer, prepared in Control Example 1, the filaments were spun in quite the same manner as that described above, resulting in worse spinnability and the maximum draw ratio of only 5 times.

EXAMPLE 6

Acrylonitrile was polymerized by itself under the same conditions as those of Control Example 2 except that the catalyst was prepared as follows: sodium nitrite and sodium bisulfite solutions were continuously fed into a catalyst reactor, stirred at the temperature of 55°C and the pH of 2.5, adjusted by means of sulfuric acid solution, for 10 minutes and thereafter, and the catalyst system was continuously fed into a polymerization vessel.

The conversion was 83%, which is considerably high in comparison with the 55% conversion of Control Example 2 and the 66% conversion of Example 3.

Even after 2 weeks' continuous operation, abnormal polymer adherence to an inner wall of the polymerization vessel and to an agitator were hardly observed. An aspect of stirring was almost perfect, there was achieved an ideal flow pattern but no short passing, resulting in a stable and continuous operation for a long period.

The polymer, thus obtained, showed high homogeneity and its reducing viscosity was 2.02. When the filaments were dry-spun in the same manner as that in Example 2, using above polymer extremely high spinnability and heat stability and a maximum draw ratio of approximately 10 times was observed.

EXAMPLE 7

The same copolymerization as that of Example 1 was repeated except that the catalyst was prepared as follows: Aqueous solutions of sodium nitrite and of sulfurous acid were continuously fed into a catalyst reactor while sodium bicarbonate solution was continuously and separately fed into the catalyst reactor to adjust the pH of the catalyst reaction system to 1.0–1.5. The catalyst components were stirred at the temperature of 55°C for 20 minutes and then, the resultant catalyst system was continuously fed into a polymerization vessel. Conversion of the copolymer was 82% in this case whereas, in case where the pH of the catalyst reaction system was adjusted to 4.5, the conversion was 73%. Further, in case where the pH was adjusted to 1.0 ~ 1.5, the reducing viscosity of the resultant polymer was 1.56 and no noticeable troubles occurred during the operation, which also resulted in continuous operation for a long period, being similar to Example 2.

The polymer, thus obtained, had extremely improved homogeneity, whiteness, heat stability and solubility. When the filaments were wet-spun under the same conditions as those of Example 5, using the polymer thus obtained extremely high spinnability and a maximum draw ratio of 10.5 times were observed.

EXAMPLE 8

The same copolymerization as that of Example 7 was repeated except that a weight ratio of water to the monomers was 3/1. Through the concentration of the monomers was high, no noticeable troubles were observed and a viscosity of the slurry was adequate during polymerization only with a slight increase at the beginning of polymerization. Stable and continuous operation was also achieved, being similar to Example 7.

Conversion was 90% and a reducing viscosity was 1.50 at $C = 0.2$. For comparison with the above, in the case where the same process as that of Control Example 1 was repeated with a weight ratio of water to the monomers being 3/1, the slurry viscosity inevitably increased and hence, it was impossible to stir and the operation could not be continued.

What is claimed is:

1. In a method for the polymerization of acrylonitrile or the copolymerization of acrylonitrile and vinyl monomers copolymerizable therewith in the presence of a redox catalyst system comprised of (i) nitrous acid or water soluble salts thereof and (ii) a reducing sulfoxy compound, the amount of reducing sulfoxy compound in terms of sodium bisulfite being from 1 to 20% based on the weight of monomer and the amount of nitrous acid or water soluble salts thereof in terms of sodium nitrite being from 1/100 to ½ of the sodium bisulfite, the improvement wherein a. at least part of the components (i) and (ii) are continuously reacted with each other under such conditions that a pH of the reaction system is within the range of 1.0 to 7.0 and the residence time is substantially constant; and b. thereafter continuously feeding the resultant catalyst system into a polymerization vessel during said polymerization or copolymerization.

2. A method as claimed in claim 1, wherein said polymerization or copolymerization is carried out at tempertures within a range of 40° to 60°C.

3. A process as claimed in claim 1, wherein said polymerization or copolymerization is carried out at a pH of said polymerization or copolymerization system within a range of 2.0 to 3.0.

4. A process as claimed in claim 1, wherein some or all of said catalyst components are continuously reacted with each other at temperatures of 20° to 60°C.

5. A process as claimed in claim 1, wherein the amount of reducing sulfoxy compound in terms of sodium bisulfite is from 2 to 10% based on the weight of monomer and the amount of nitrous acid or water soluble salts thereof in terms of sodium nitrite are from 1/5 to 1/50 of the sodium bisulfite.

* * * * *